No. 860,133. PATENTED JULY 16, 1907.
J. HIPPISLEY.
WHEEL.
APPLICATION FILED DEC. 3, 1906.
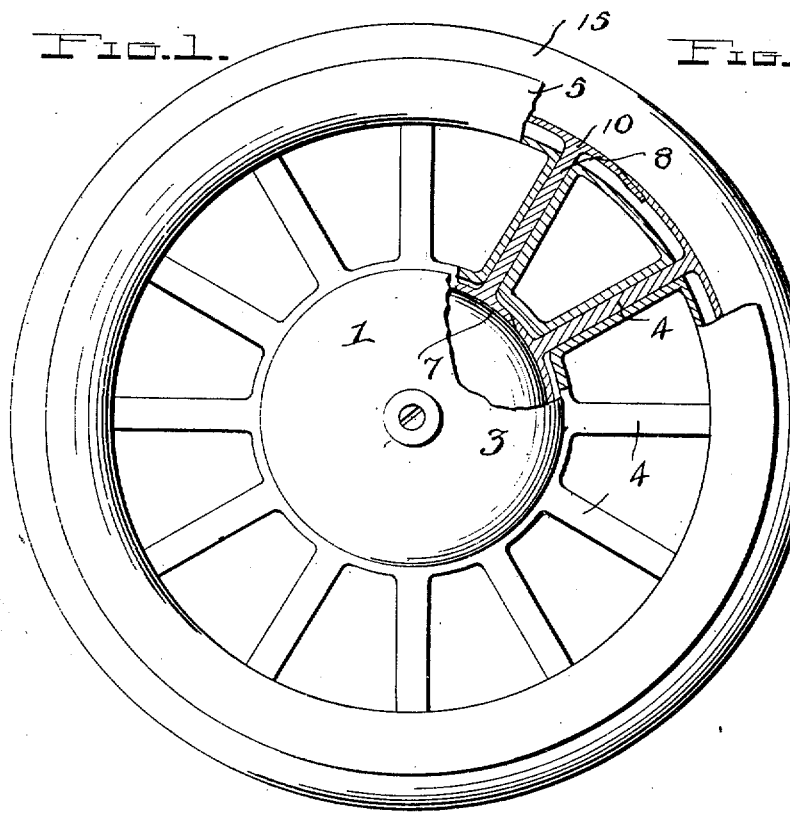
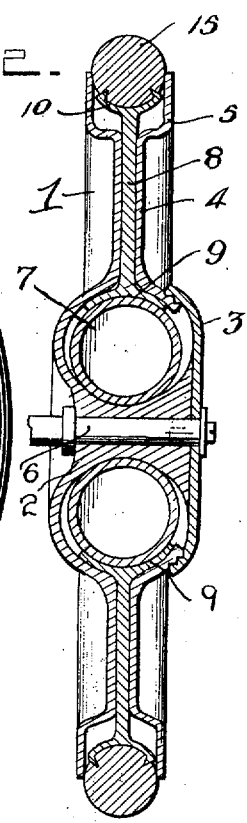
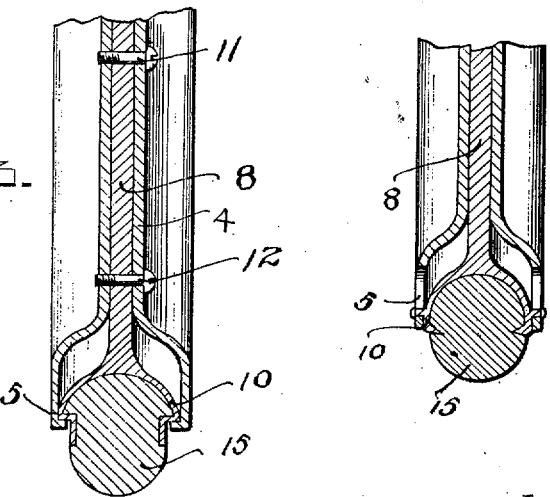
Witnesses
Chas. L. Griesbauer.
C. H. Griesbauer.
Inventor
J. HIPPISLEY
by H. B. Willson & Co.
Attorneys

UNITED STATES PATENT OFFICE.

JAMES HIPPISLEY, OF TRENTON, NEW JERSEY.

WHEEL.

No. 860,133.  Specification of Letters Patent.  Patented July 16, 1907.

Application filed December 3, 1906. Serial No. 346,160.

*To all whom it may concern:*

Be it known that I, JAMES HIPPISLEY, a subject of the King of Great Britain, residing at Trenton, in the county of Mercer and State of New Jersey, have invented certain new and useful Improvements in Wheels; and I do declare the following to be a full, clear, and exact description of the invention, such as will enable others skilled in the art to which it appertains to make and use the same.

This invention relates to an improved vehicle wheel.

The object of the invention is to provide a wheel with cushioning means in its hub and on its rim connected by pistons.

Figure 1, of the accompanying drawings, represents a side elevation of a wheel, partly in section, constructed in accordance with this invention; Fig. 2 represents a vertical section thereof; Fig. 3 represents a detail vertical section, showing one form of the rim and tire; and Fig. 4 represents a similar view of another form of rim and tire.

In the embodiment illustrated, the wheel 1 is constructed with an enlarged hollow hub 2 having a detachable cap 3. Radiating from the hub 2 are a plurality of hollow spokes 4, attached to the rim 5, which latter is of the ordinary construction. Disposed in said hollow hub around the axle 6 is a cushioning device 7, preferably in the form of a pneumatic tube. This tube may be placed in and removed from the hub 2 by removing the cap 3 and said tube is made slightly smaller than the hub to provide for the expansion of the tube therein when pressure is exerted on the wheel tire. Disposed in each hollow spoke 4 is a piston-like member 8, having a bearing plate 9 of any suitable shape at its inner end to engage the cushioning tube 7 in the hub and a plate 10 of suitable shape on its other end to engage the tire 15, which latter may be of any suitable construction to cushion the wheel. The bearing plates 10 are preferably attached to the tire 15 to prevent the tire from becoming accidentally disengaged from the rim. These pistons 8 are freely movable in the spokes 4 and when the tire 15 is depressed, the pistons are forced up and the hub cushioning device 7 is depressed, which relieves the vehicle from jars. The plates 9 and 10 of the several pistons, preferably overlap to form a continuous outer rim or false bottom. If desired, screws, as 11 and 12, may be inserted transversely through the spoke and pistons near their inner and outer ends to hold the parts rigidly in place as in an ordinary wheel.

By the use of my improved wheel, there is a great saving in tires and the movement of the vehicle is much easier, as it is supported by two sets of tires, one at the hubs and the other at the rims of the wheels.

I claim as my invention,—

1. A vehicle wheel having an enlarged hollow hub, a flexible tube disposed in said hub around the axle, a rim having a cushioning tire thereon, hollow spokes connecting said hub and rim, and pistons longitudinally movable in said spokes and having bearing plates at their opposite ends to engage said hub tube and tire.

2. A vehicle wheel having an enlarged, hollow hub, a flexible tube disposed in said hub around the axle, a rim having a cushioning tire thereon, hollow spokes connecting said hub and rim, and pistons longitudinally movable in said spokes and having overlapping bearing plates at their opposite ends to engage said hub tube and tire.

3. A vehicle wheel having a hollow hub, cushioning means in said hub, a rim with a cushioning tire thereon, hollow spokes connecting said hub and rim, and pistons longitudinally movable in said spokes and having overlapping plates at their outer ends to engage said tire.

In testimony whereof I have hereunto set my hand in presence of two subscribing witnesses.

JAMES HIPPISLEY.

Witnesses:
ANNA T. MULDOON,
W. HOLT APGAR.